US012449753B2

(12) United States Patent
Kawasumi

(10) Patent No.: US 12,449,753 B2
(45) Date of Patent: Oct. 21, 2025

(54) POWER FEED PATH UNIT, IMAGE FORMING APPARATUS, AND ASSEMBLY METHOD FOR POWER FEED PATH UNIT

(71) Applicant: CANON KABUSHIKI KAISHA, Tokyo (JP)

(72) Inventor: Ryoichi Kawasumi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/583,920

(22) Filed: Feb. 22, 2024

(65) Prior Publication Data

US 2024/0192631 A1 Jun. 13, 2024

Related U.S. Application Data

(63) Continuation of application No. 17/469,809, filed on Sep. 8, 2021, now Pat. No. 11,940,751.

(30) Foreign Application Priority Data

Sep. 18, 2020 (JP) ................................ 2020-156946

(51) Int. Cl.
*G03G 15/00* (2006.01)

(52) U.S. Cl.
CPC .................................... *G03G 15/80* (2013.01)

(58) Field of Classification Search
USPC ............................................................ 399/88
See application file for complete search history.

(56) References Cited

U.S. PATENT DOCUMENTS

| | | | | |
|---|---|---|---|---|
| 8,023,854 | B2 | 9/2011 | Hiroyuki | |
| 10,042,312 | B2 | 8/2018 | Imaizumi | |
| 10,148,833 | B2 | 12/2018 | Nakayama | |
| 10,530,944 | B2 | 1/2020 | Nakayama | |
| 10,701,224 | B2 | 6/2020 | Nakayama | |
| 11,082,571 | B2 | 8/2021 | Nakayama | |
| 2014/0286655 | A1 | 9/2014 | Makino | |
| 2015/0295336 | A1 | 10/2015 | Cole | |
| 2015/0378303 | A1* | 12/2015 | Ohata | H01B 1/02 174/126.1 |
| 2017/0242390 | A1 | 8/2017 | Miyakoshi | |
| 2020/0125025 | A1* | 4/2020 | Seto | H01R 13/33 |
| 2021/0329137 | A1 | 10/2021 | Nakayama | |

FOREIGN PATENT DOCUMENTS

| | | | |
|---|---|---|---|
| JP | 2008-242070 | A | 10/2008 |
| JP | 2010-217774 | A | 9/2010 |
| JP | 2016-12066 | A | 1/2016 |
| JP | 2017-194630 | A | 10/2017 |
| KR | 10-2004-9173 | A | 1/2004 |

OTHER PUBLICATIONS

Japanese Search Report issued Apr. 23, 2024 in corresponding Japanese Application No. 2020-156946 (English translation included).

* cited by examiner

*Primary Examiner* — Quana Grainger
(74) *Attorney, Agent, or Firm* — VENABLE LLP

(57) ABSTRACT

An automatic assembly tool can be used to perform placement of a conductive wire material that passes through a plurality of surfaces in a power feed path unit, thus enabling reduced costs and improved assembly productivity for the power feed path unit.

8 Claims, 9 Drawing Sheets

POWER FEED PATH UNIT, IMAGE FORMING APPARATUS, AND ASSEMBLY METHOD FOR POWER FEED PATH UNIT

This application is a continuation of U.S. application Ser. No. 17/469,809 filed Sep. 8, 2021, which claims the benefit of Japanese Patent Application No. 2020-156946, filed Sep. 18, 2020, the contents of each of which are incorporated by reference herein.

BACKGROUND OF THE INVENTION

Field of the Invention

The present invention relates to a power feed path unit that configures an electrical connecting path, an image forming apparatus, such as a copying machine or a printer, that comprises the power feed path unit, and an assembly method for the power feed path unit.

Description of the Related Art

Conventionally, a typical configuration for supplying power to a unit being supplied that requires a high voltage is a configuration in which a cable equipped with a shield capable of withstanding a high voltage is connected from a high-voltage supply source to the unit being supplied.

However, as a high-voltage power feed configuration in the electrophotographic-system image forming apparatuses of recent years, a configuration that uses a conductive wire material such as a wire spring rather than the foregoing cable has become mainstream. More specifically, a configuration in which a power feed path unit is provided between the high-voltage supply source and the unit being supplied is known.

Japanese Patent Application Laid-Open No. 2010-217774 discloses a mechanism that comprises, on a power feed path unit, a wire spring constituting a conductive wire material, and compression springs connected at both ends of the wire spring, wherein a high-voltage power feed path is configured by connecting one compression spring to the supply source and connecting the other compression spring to the unit being supplied.

In the case of the image forming apparatuses of recent years, there has been a demand for parts and a unit configuration that enable improved assembly productivity, as well as compactness and a low cost.

As a result, in the case of recent mainstream power feed configurations, conductive wire materials such as wire springs pass through a plurality of surfaces in the power feed path unit in order to maintain compactness, and the shapes of the wire materials are becoming more and more complex.

Furthermore, the manual assembly of such conductive wire materials is considered to be costly due to the drop in assembly productivity. As a countermeasure to this problem, there has been a desire for a configuration in which conductive wire material can be placed using an automatic assembly tool, for example, without relying on human hands.

It is desirable to use an automatic assembly tool to perform placement of a conductive wire material that passes through a plurality of surfaces in the power feed path unit, thus enabling reduced costs and improved assembly productivity for the power feed path unit.

SUMMARY OF THE INVENTION

A power feed path unit according to the present embodiment has a plurality of surfaces that forms a predetermined angle and in which power feed path unit an automatic assembly tool is used to place a conductive wire material on the plurality of surfaces so as to configure an electrical connecting path, the power feed path unit including:

a wire fixing portion configured to fix the end of the conductive wire material; and a groove portion that is formed continuously so as to pass through the plurality of surfaces and that forms a path for placement of the conductive wire material that is fixed to the wire fixing portion.

Further features of the present invention will become apparent from the following description of exemplary embodiments with reference to the attached drawings.

DESCRIPTION OF THE EMBODIMENTS

A preferred embodiment of the present invention will be described in detail hereinbelow with reference to the drawings by way of example. However, the dimensions, material properties, shapes, and relative arrangements of the components disclosed in the following embodiment should be changed as needed, depending on the configuration and various conditions of the device to which the present invention is applied, and are not intended to limit the scope of the present invention to this embodiment alone. Moreover, the same reference signs are assigned to members and parts common to the drawings.

(Image Forming Apparatus)

Figure 1:
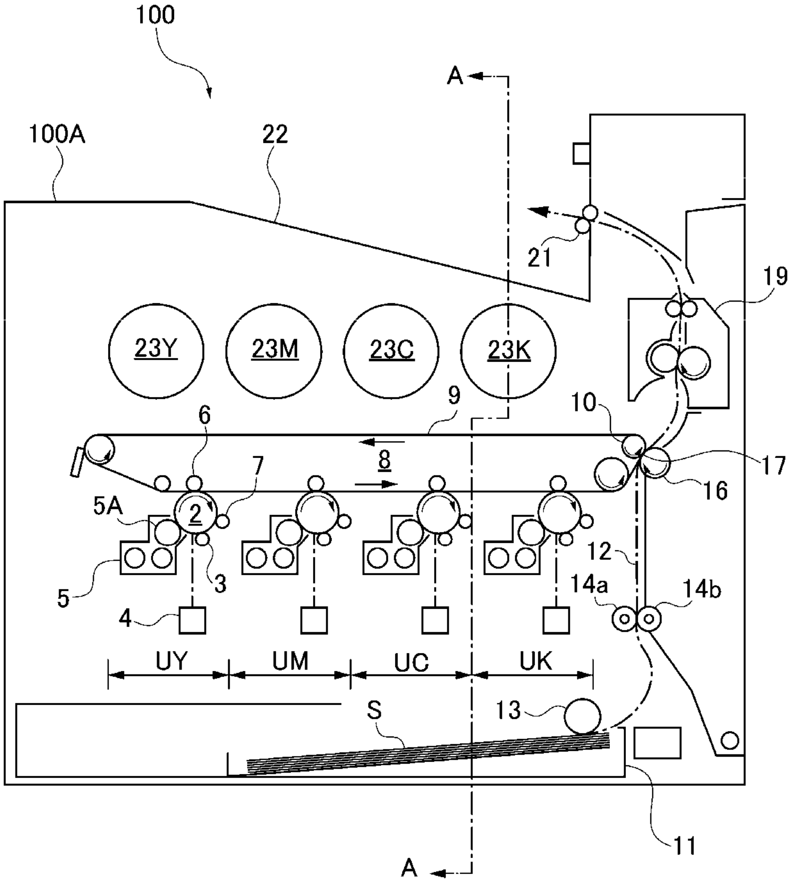
FIG. 1 is a cross-sectional view of an image forming apparatus.

First, an image forming apparatus according to this exemplary embodiment will be described using FIG. 1. FIG. 1 is a vertical front schematic of an image forming apparatus 100 according to this exemplary embodiment.

The image forming apparatus 100 is a four-color, full-color laser printer of a tandem-type intermediate transfer system that uses an electrophotographic process, and that performs toner image formation on a sheet S on the basis of image information that is input to a control circuit portion (not illustrated) from an external host device (not illustrated) such as a personal computer.

As an image forming portion inside the main body of the image forming apparatus (appearing hereinbelow as the "device main body") 100A, the image forming portion has four, first to fourth, imaging units U. The first to fourth imaging units U respectively form toner images in four colors, namely, yellow (Y), magenta (M), cyan (C), as well as black (K). The first to fourth imaging units U are image forming units that are removably mounted on the device main body 100A.

The first imaging unit UY forms a yellow (Y) toner image. The second imaging unit UM forms a magenta (M) toner image. The third imaging unit UC forms a cyan (C) toner image. The fourth imaging unit UK forms a black (K) toner image. Each imaging unit U has a rotating drum-type electrophotographic photoreceptor (appears as "drum" hereinbelow) 2 that serves as an image bearing member. Further, each imaging unit U has, as process portions acting on the drum 2, a charging roller 3, a laser scanner (exposure device) 4, a development device 5, a primary transfer roller 6, and a drum cleaner 7.

Note that, in order to avoid complicating the drawings, other than the first imaging unit UY, no reference signs have been added to the devices in the imaging units UM, UC, or UK.

Furthermore, there is an intermediate transfer belt unit 8 on the upper side of the first to fourth imaging units U of the device main body 100A. There is also a sheet cassette 11 on the lower side of the first to fourth imaging units U of the device main body 100A. Additionally, 23Y, 23M, 23C, and 23K are removable and replaceable toner bottles for holding refill toner for the first to fourth imaging units U respectively, and are placed on the upper side of the intermediate transfer belt unit 8. The development device 5 which the respective imaging units UY, UM, UC, UK comprise is refilled, from the corresponding toner bottles 23Y, 23M, 23C, and 23K, with an appropriate amount of toner as needed, using a toner replenishment mechanism (not illustrated).

An image forming operation requires the formation of a latent image on the drum 2 of the first to fourth imaging units U. As a preparatory operation, a high voltage is applied to the charging roller 3, which is pressed against the drum 2, so as to charge the surface of the drum 2 uniformly as same rotates.

Next, a high voltage is applied to a development sleeve 5A inside the development device 5 via a different path from that of the charging roller 3, thus causing the surface of the development sleeve 5A to be uniformly coated with toner that has been electrified inside the development device 5.

Further, a latent image is formed due to the change in potential of the surface of the drum 2 due to laser scanning by the laser scanner 4, and the toner on the development sleeve 5A develops the latent image on the drum 2 as a toner image.

The toner image on the drum 2 undergoes a primary transfer to the surface of the belt 9 in the order of the foregoing colors, as the intermediate transfer belt (the intermediate transfer member) 9 rotates. Superimposed toner images in the four colors Y, M, C, and K are accordingly formed on the belt 9.

An upward conveyance path 12 (the dotted line in FIG. 1) for conveying sheet S from the bottom to the top is placed on the right side inside the device main body 100A. Placed on the conveyance path 12 in order from the lower side to the upper side are: an outfeed roller 13, a pair of registration rollers 14*a*, 14*b*, a secondary transfer roller 16, a fixer (fixing device) 19, and a discharge roller 21. The secondary transfer roller 16 abuts, with a predetermined pressing force via the belt 9, against a belt suspension roller 10 on the right side of the intermediate transfer belt unit 8, thereby forming a secondary transfer nip portion 17 with the belt 9.

When the outfeed roller 13 is driven with predetermined control timing, one sheet (recording material, paper) S is fed separately from the sheet cassette 11 and introduced to the conveyance path 12. The separately fed sheet S is then introduced to the secondary transfer nip portion 17 by the pair of registration rollers 14*a*, 14*b* with predetermined control timing, thus being conveyed while being held from both sides. Accordingly, the superimposed toner images in four colors on the belt 9 are collectively secondary transferred to the sheet S in the secondary transfer nip portion 17, and unfixed toner images are formed on the sheet S.

The sheet S, having left the secondary transfer nip portion 17, is introduced to the fixer 19 and is subjected, under heat and pressure, to a toner-image fixing treatment. After leaving the fixer 19, the sheet S is discharged as an image-formed article to a discharge tray 22, which is an upper surface portion of the device main body 100A, by the discharge roller 21.

(Power Feed Path Configuration)

Figure 2:
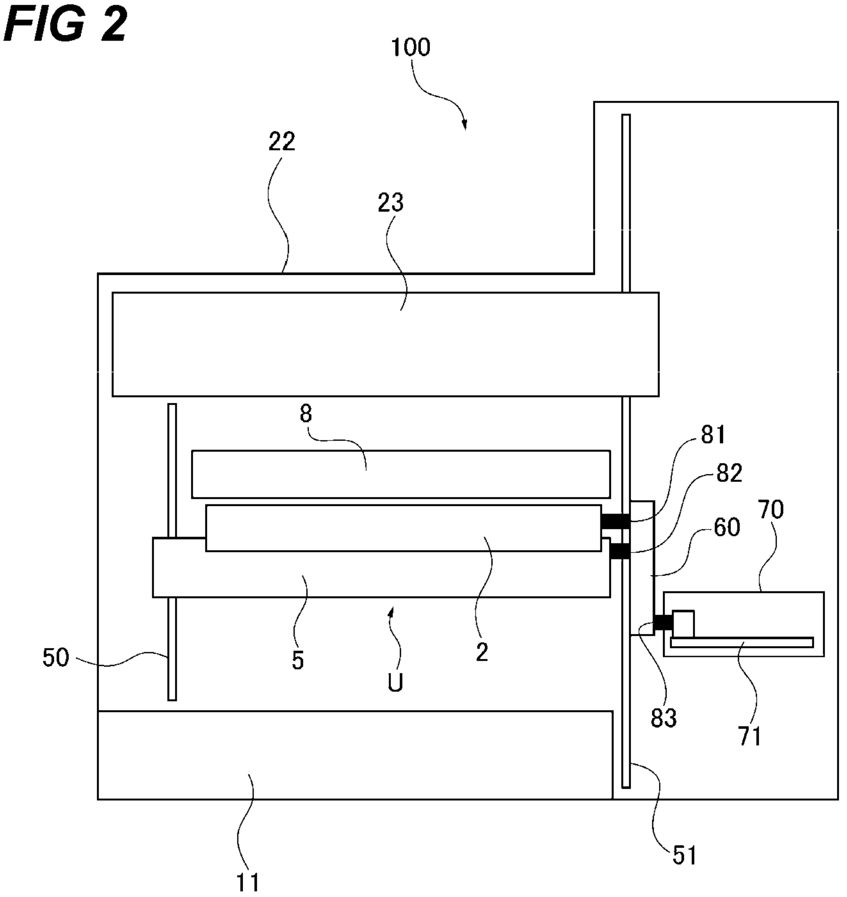
FIG. 2 is a schematic of a cross-section along line A-A of the image forming apparatus in FIG. 1.

Here, the configuration of the power feed path will be described in detail. FIG. 2 is a schematic of a cross-section along line A-A of the image forming apparatus in FIG. 1.

A high-voltage unit 70 and a power feed path unit 60 are provided to the device main body 100A of the image forming apparatus 100. The high-voltage unit 70 is a supply source configured to supply a voltage to the imaging units U mounted on the device main body 100A. The power feed path unit 60 is a power feed path unit that configures a path which electrically connects the high-voltage unit 70 to the imaging units U and which supplies a voltage from the high-voltage unit 70, which is a supply source, to the imaging units U, which are units being supplied.

In FIG. 2, the imaging units U are supported between a front side plate 50 and a rear side plate 51 that constitute a frame body of the device main body 100A. Similarly, the intermediate transfer belt unit 8 is supported between the front side plate 50 and the rear side plate 51 that constitute the frame body of the device main body 100A. The high-voltage unit 70, which is the supply source for supplying a high voltage to the imaging units U, is provided with a high-voltage substrate 71, and is disposed on the back surface of the rear side plate 51.

The power feed path unit 60 is disposed on the back surface of the rear side plate 51. The power feed path unit 60 is provided between the imaging units U mounted on the device main body 100A and the high-voltage unit 70 disposed on the device main body 100A. The supplying of a high voltage from the high-voltage unit 70 to the imaging units U is performed via the power feed path unit 60.

The power feed path unit 60 is provided with: a substrate contact 83, which is a path to the high-voltage substrate 71 of the high-voltage unit 70, a charging contact 81, which supplies a high voltage to the charging roller 3 of the imaging units U, and a development contact 82, which supplies a high voltage to the development sleeve 5A. The charging contact 81, the development contact 82, and the substrate contact 83 are configured from a cylindrically shaped compression spring, form a power feed path in the power feed path unit 60, and fulfill the role of absorbing positional shifts between the units.

Arranged in the space on the back surface of the rear side plate 51 are various units other than the high-voltage unit 70. Therefore, in order to reduce the size of the device main body 100A, the units must be efficiently arranged so as to minimize the space same occupy. Hence, in the power feed path unit 60, a plurality of surfaces forming a predetermined angle is used in order to minimize the size of the device main body in the height direction (the vertical direction). More specifically, in the power feed path unit 60, the substrate contact 83 is disposed on a first surface (the back side surface) opposite the high-voltage unit 70. In the power feed path unit 60, the charging contact 81 and the development contact 82 are arranged on a second surface (front side) that forms a predetermined angle (180° here) relative to the first surface and that lies opposite the imaging units U.

Figure 3:
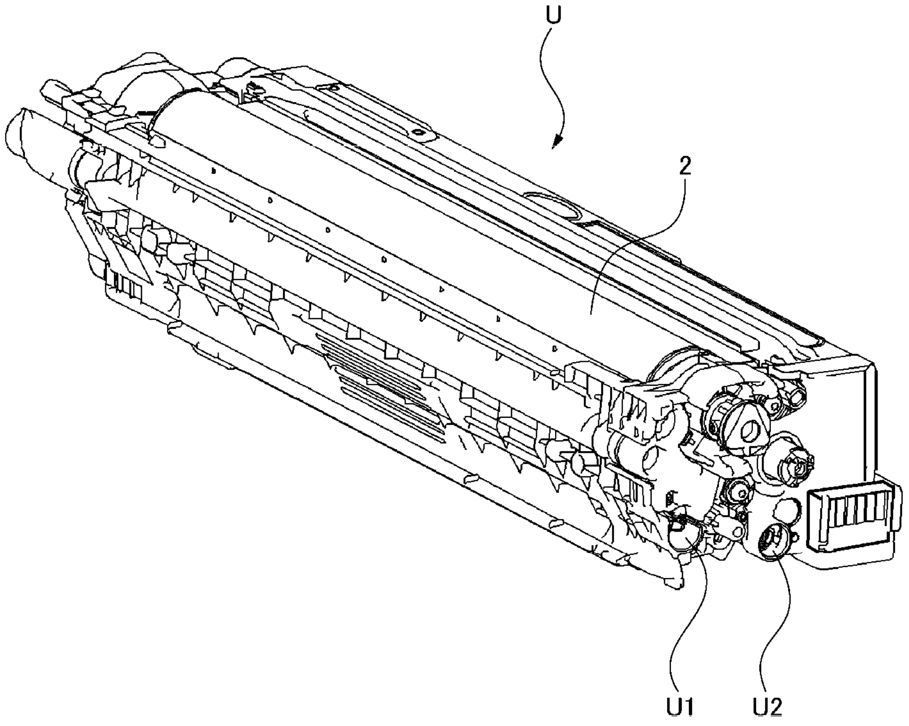
FIG. 3 is a perspective view of an imaging unit.

FIG. 3 is a perspective view in which the imaging units U are seen from the contact side (the side which the contact of the power feed path unit 60 abuts against). Arranged in the unit housing of the imaging units U are a contact plate U1 which the charging contact 81 of the power feed path unit 60 abuts against, and a contact plate U2 which the development contact 82 abuts against. In the imaging unit U, the contact plates U1 and U2 are arranged on the side of one end of the imaging unit U in the longitudinal direction and on the side facing the power feed path unit 60 that is disposed on the rear side plate 51 forming the frame body of the device main body 100A. In the imaging units U, the contact plate U1 is disposed in a position corresponding to the charging contact 81 of the power feed path unit 60, and the contact plate U2 is disposed in a position corresponding to the development contact 82 of the power feed path unit 60. A cylindrical guide shape is formed around the contact plates U1 and U2 of the imaging units U and is configured such that the charging contact 81 and the development contact 82 of the power feed path unit 60 are reliably guided to the respective contact plates U1 and U2.

Figure 4:
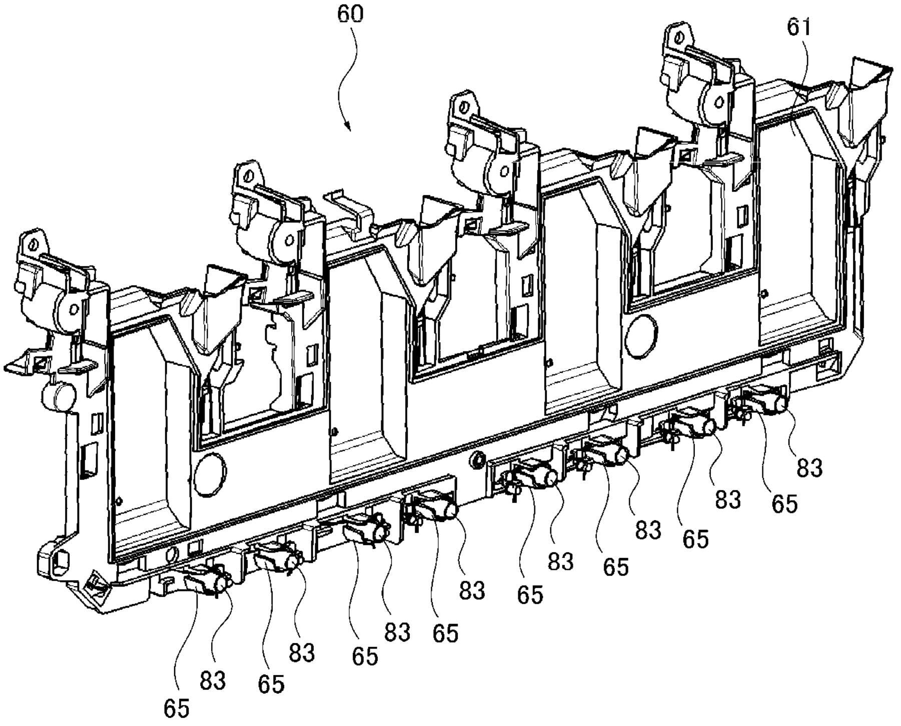
FIG. 4 is a perspective view of a power feed path unit.
Figure 5:
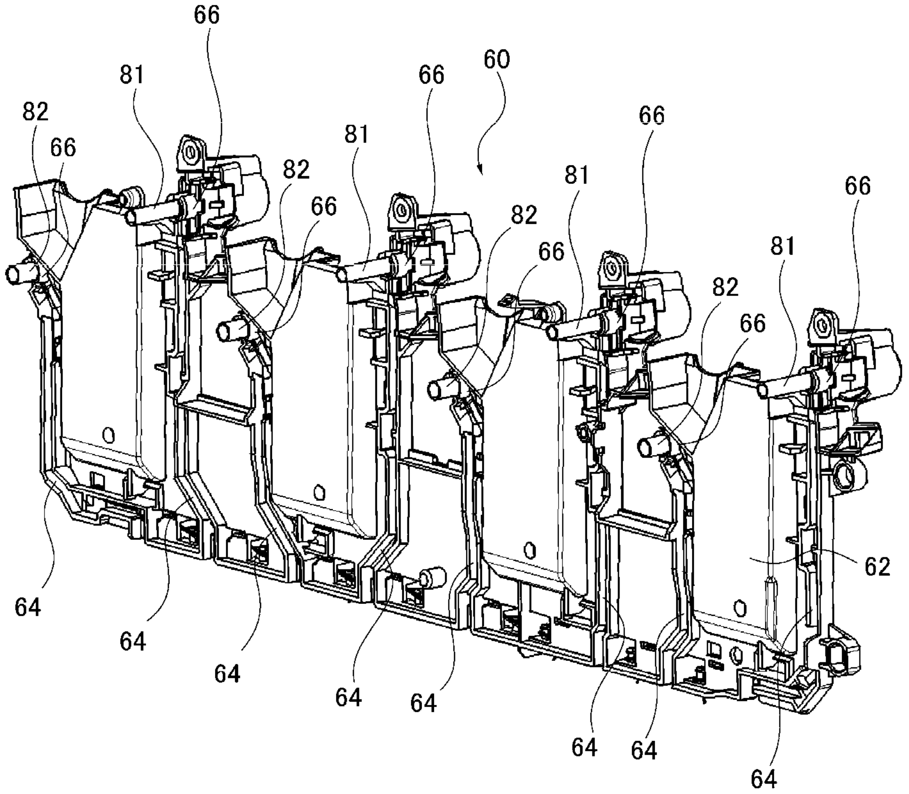
FIG. 5 is a perspective view of the power feed path unit.

FIGS. 4 and 5 are perspective views of the power feed path unit 60. FIG. 4 illustrates a back side surface of the power feed path unit 60 whereon the substrate contacts 83 are arranged, and FIG. 5 illustrates the front side surface of the power feed path unit 60 whereon the charging contacts 81 and the development contacts 82 are arranged.

The power feed path unit 60 has a plurality of surfaces that forms a predetermined angle. Here, the power feed path unit 60 has, as the plurality of surfaces forming a predetermined angle, a back side surface 61 facing the high-voltage unit 70, and a front side surface 62 facing the imaging units U. When the back side surface 61 is taken to be a first surface, the front side surface 62 is then a second surface which forms a predetermined angle (180° here) relative to the back side surface 61. Note that the plurality of surfaces which the power feed path unit 60 includes is not limited to the foregoing back side surface and front side surface, and that the predetermined angle formed by the plurality of surfaces is not limited to the aforementioned 180°.

The power feed path unit 60 is provided with: a wire fixing portion 63 configured to fix the end of a conductive wire 200 which is conductive wire material; and a groove portion 64 that is formed continuously so as to pass through the plurality of surfaces 61, 62 and that forms a path for placement of the conductive wire 200 which is fixed to the wire fixing portion 63. The wire fixing portion 63 (see FIG. 8) will be described subsequently.

In the power feed path unit 60, the charging contact 81 and the development contact 82 are provided on the front side surface 62, which serves as the second surface, and the substrate contact 83 is provided on the back side surface 61, which serves as the first surface. The charging contact 81 and the development contact 82 of the power feed path unit 60 correspond to the contact plates U1 and U2, respectively, of the imaging units U, there being an arrangement of eight in total of the charging contacts 81 and the development contacts 82. In addition, the substrate contact 83 similarly also corresponds to the charging contact 81 and the development contact 82, there being an arrangement of eight in total of the substrate contacts 83. The power feed path unit 60 comprises a plurality of groove portions 64 formed continuously from the back side surface 61 to the front side surface 62. Here, a total of eight groove portions 64 are provided, including groove portions 64 linking the substrate contact 83 to the charging contacts 81, and groove portions 64 linking the substrate contacts 83 to the development contacts 82.

Figure 9:
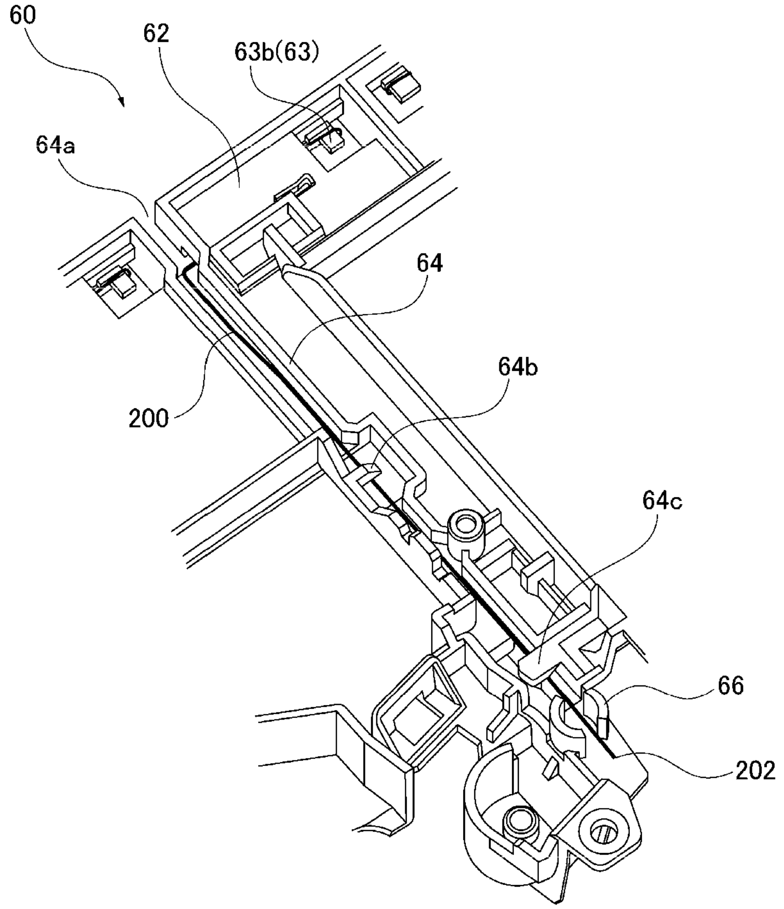
FIG. 9 is a partial enlarged view of the power feed path unit in FIG. 8.

The power feed path unit 60 is provided with a first cylindrical portion 65 (see FIG. 7) and a second cylindrical portion 66 (see FIG. 9). The first cylindrical portion 65 and second cylindrical portion 66 are attachment portions configured to attach contacts which are cylindrically shaped compression springs. The first cylindrical portion 65 is a first attachment portion configured to attach the substrate contact 83 which is a first contact. The first cylindrical portion 65 is provided to the back side surface 61, which is the first surface where the wire fixing portion 63 is provided. The second cylindrical portion 66 is a second attachment portion configured to attach the charging contact 81 and the development contact 82, which are second contacts. The second cylindrical portion 66 is provided to the front side surface 62, which is the second surface forming a predetermined angle (180° here) relative to the back side surface 61.

A power feed path that extends from each substrate contact 83 to the charging contacts 81 and development contacts 82 via eight conductive wires that run along the groove portions 64 illustrated in FIG. 5. The groove portions 64 are paths that are formed with a C-shaped groove cross-section. The conductive wires are placed on the bottom surface of the groove of the groove portions 64. The conductive wires are a conductive wire material that is configured from a steel wire without shield or coating, such as a jumper wire.

Here, the conductive wires can also be configured integrally with a compression spring, which is a contact at both ends of the wire spring, but the shape is then more complicated, and the cost of parts is higher. Furthermore, assembly is difficult and thus assembly must be performed by hand, and because there are eight conductive wires, which is a large number, the assembly cost is also high. It is thus clear that, in order to reduce the cost of such a power feed path unit 60, it is desirable to separate the conductive wires from the compression springs at the ends and to assemble the conductive wires using an automatic assembly tool that utilizes a robot arm or similar, instead of relying on human hands.

Here, the power feed path unit 60 according to this exemplary embodiment configures an electrical connecting path by using an automatic assembly tool 400, described subsequently, to place the conductive wire 200, which is the conductive wire material, on the plurality of surfaces 61, 62.

(Conductive Wire Automatic Assembly Tool)

Figure 6:
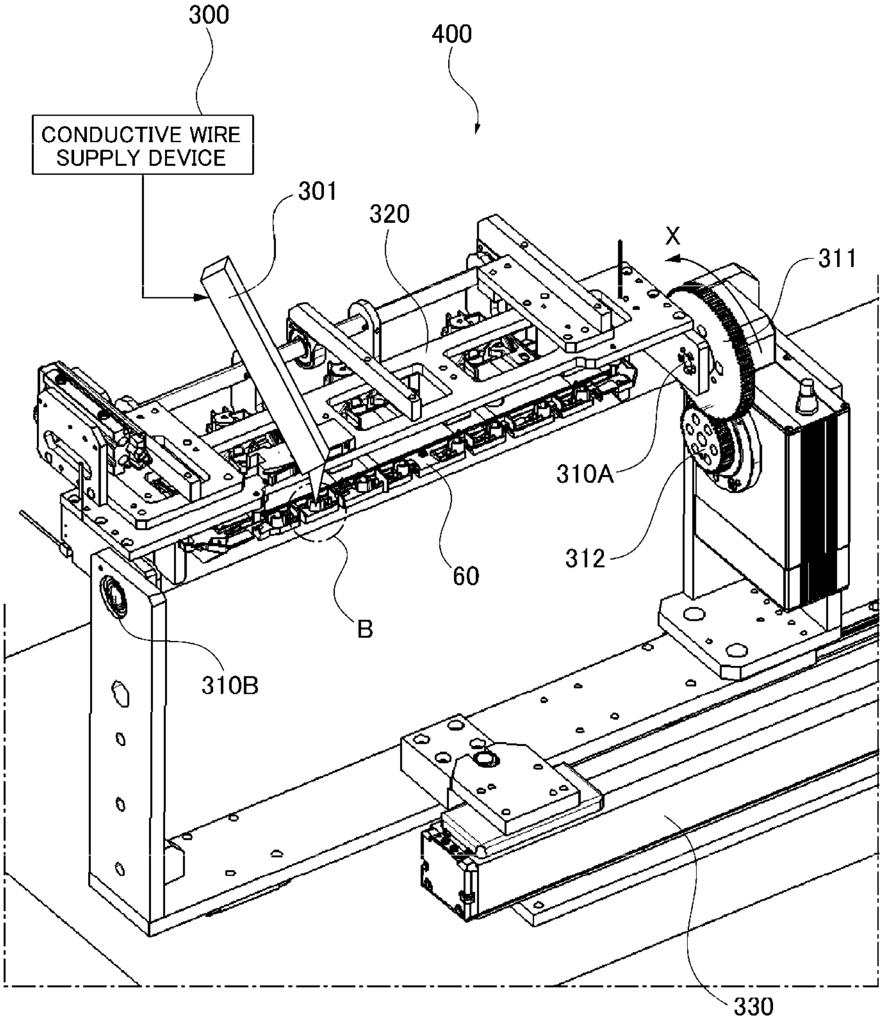
FIG. 6 is a perspective view of an automatic assembly tool.

Next, a conductive wire automatic assembly tool will be described in detail. FIG. 6 is a perspective view of the automatic assembly tool 400 in a state where the power feed path unit 60 is mounted.

In FIG. 6, the power feed path unit 60 is mounted on the automatic assembly tool 400 with the back side surface 61 illustrated in FIG. 4 as the upper surface. Furthermore, the automatic assembly tool 400 is provided with a unit fixing rack 320 and fixing rack rotating shafts 310A, 310B. The automatic assembly tool 400 is provided with a rotary gear 311 that is disposed on the rotating shaft 310A, a drive gear 312, and an arm 301 for placing the conductive wire.

The arm 301 is hollow, and the conductive wire supplied from the external conductive wire supply device 300 passes through the interior thereof and continues to the nozzle opening at the tip of the arm 301.

The arm 301 is an articulated robot arm that is provided with a predetermined degree of freedom of about six axes, and is capable of moving three-dimensionally along the path provided in the power feed path unit 60 in which the conductive wires are to be placed.

The placement of the conductive wire is performed by moving the nozzle at the tip of the arm 301 along the path of the power feed path unit 60. However, simply moving the nozzle is not enough to place the conductive wire in the targeted position, and it is necessary to fix the conductive wire close to the starting point of the conductive wire placement and then feed out the conductive wire as the nozzle moves.

Figure 7:
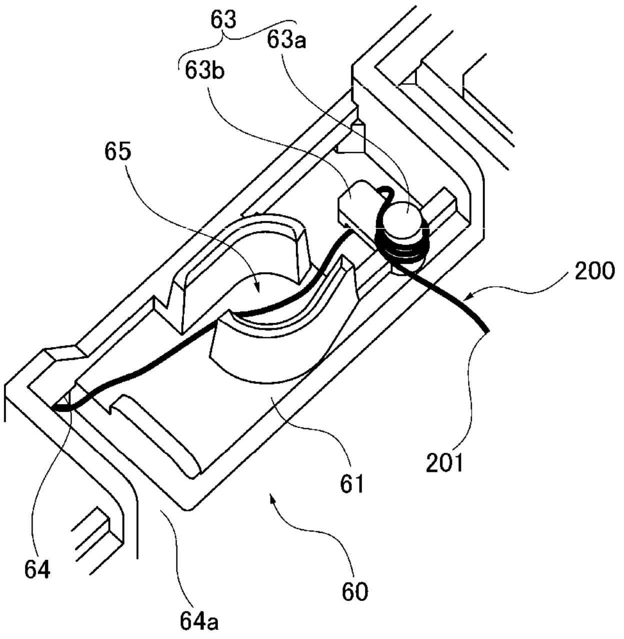
FIG. 7 is a partial enlarged view of the power feed path unit in FIG. 6.

The start of the placement of the conductive wires in each path of the power feed path unit 60 takes place from position B in FIG. 6. Position B is close to the placement of the substrate contact 83 in FIG. 4, an enlarged view of which is illustrated in FIG. 7.

In addition to the groove portion 64 (see FIG. 5), the first cylindrical portion 65 (see FIG. 7), and the second cylindrical portion 66 (see FIG. 9), which are formed by passing through a plurality of surfaces, the power feed path unit 60 is provided with a wire fixing portion 63 configured to fix the end of the conductive wire 200, which is conductive wire material. In FIG. 7, a conductive wire 200 has been placed on the back side surface 61 of the power feed path unit 60, and the tip of the conductive wire 200, which is also the starting point of the placement, is indicated by 201.

The wire fixing portion 63 has a shaft portion 63*a*, which is a first locking portion, and a hooking portion 63*b*, which is a second locking portion. The shaft portion 63*a* and the hooking portion 63*b* of the wire fixing portion 63 are formed on a peripheral edge portion of the power feed path unit 60. The fixing of the conductive wire 200 is carried out by winding the conductive wire 200 around the shaft portion 63*a* and passing the wound conductive wire 200 through the hooking portion 63*b* so as to route the conductive wire 200 in the opposite direction to the direction in which same is wound around the shaft portion 63*a*.

The first cylindrical portion 65 is a first attachment portion configured to attach the substrate contact 83 (see FIG. 4), which is a first contact. The first cylindrical portion 65 is provided to the back side surface 61 where the wire fixing portion 63 is provided. The substrate contact 83 is a cylindrically shaped compression spring, and the first cylindrical portion 65 has two slits that serve as paths for the conductive wire 200. The second cylindrical portion 66 (see FIG. 9) will be described subsequently.

After the conductive wire 200 is placed through the two slits in the first cylindrical portion 65, the substrate contact 83, which is a cylindrically shaped compression spring, is dropped in, along the inner circumference of the first cylindrical portion 65. Then, by using the high-voltage unit 70 to apply a force to the substrate contact 83, a power feed path is formed from the high-voltage substrate 71 to the substrate contact 83 and then to the conductive wire 200. The contact between the contacts is guaranteed by the reaction force of the spring, so even if the unit is out of position, the contacts will not float so as to interrupt the power feed path.

Fixation in the vicinity of the starting point of the placement, which is necessary for the placement of the conductive wire 200, is performed by winding the conductive wire 200 around the shaft portion 63*a*. In FIG. 6, the conductive wire 200 is fixed and placed with about three windings in a clockwise direction, and then the path passes under the hooking portion 63*b* and subsequently through the first cylindrical portion 65.

By fixing the conductive wire 200 to the wire fixing portion 63, the conductive wire 200 can be pulled out from inside by the movement of the nozzle of the arm 301 and placed as far as the end of the path.

The number of windings around the shaft portion 63*a* is not limited to three, and may be as many or as few as desired; however, in the case of multiple windings, same may be made to go through the first cylindrical portion 65 without passing through the hooking portion 63*b*, because sufficient fixation can be expected through winding alone. In other words, the wire fixing portion 63 may be configured to have only the shaft portion 63*a* as the first locking portion formed on the peripheral edge portion of the power feed path unit, and the fixing of the conductive wire 200 is performed by winding the conductive wire 200 around the shaft portion 63*a*. However, when the number of windings is small, a configuration is desirable in which the conductive wire 200 is passed through the hooking portion 63*b* in order to reliably fix the conductive wire 200. When passing the conductive wire through the hooking portion 63*b*, the placement direction of the conductive wire after hooking should be in the opposite direction to the winding direction around the shaft portion 63*a*, whereby the tension applied to the conductive wire 200 as the nozzle moves will work in the direction in which the winding around the shaft portion 63*a* is tightened, thus yielding a reliable fixing effect.

The path of the conductive wire 200 after passing through the first cylindrical portion 65 moves from the slit 64*a* illustrated in FIG. 6 to the front side surface 62 (the surface illustrated in FIG. 5) of the power feed path unit 60.

Here, it is obvious that the placement of the conductive wire 200 against the front side surface 62 is difficult in the state illustrated in FIG. 6, therefore it is necessary to modify the relative placement of the power feed path unit 60 to the arm 301.

Such modified placement is carried out by rotating the power feed path unit 60 in the automatic assembly tool 400. By rotating the drive gear 312 illustrated in FIG. 6 so as to rotate the rotary gear 311, which is engaged with the drive gear 312, in the direction of the arrow X, the unit fixing rack 320, whereon the power feed path unit 60 is fixed, can be rotated about the rotating shaft 310.

Note that the fixing portion configured to fix the conductive wire 200 does not necessarily need to be provided in the power feed path unit 60 and, rather, may be provided on the automatic assembly tool 400 side close to the starting point of the placement. However, in that case, when the power feed path unit 60 is removed from the automatic assembly tool 400, the fixation of the conductive wire 200 must be released from the automatic assembly tool 400, and therefore not only the fixing portion but also a mechanism for releasing the fixing are required. Hence, when the foregoing power feed path unit 60 is rotated, the fixing portion and a fixing release mechanism, which are provided on the automatic assembly tool 400 side, must also be rotated together. In this case, the scale of the automatic assembly tool configuration becomes bloated, and the cost of the jig, as well as the cost of maintenance, are also disadvantageous.

In light of the foregoing, it is clear that it is advantageous to place the fixing portion, which is configured to fix the conductive wire 200, atop the power feed path unit 60.

Figure 8:
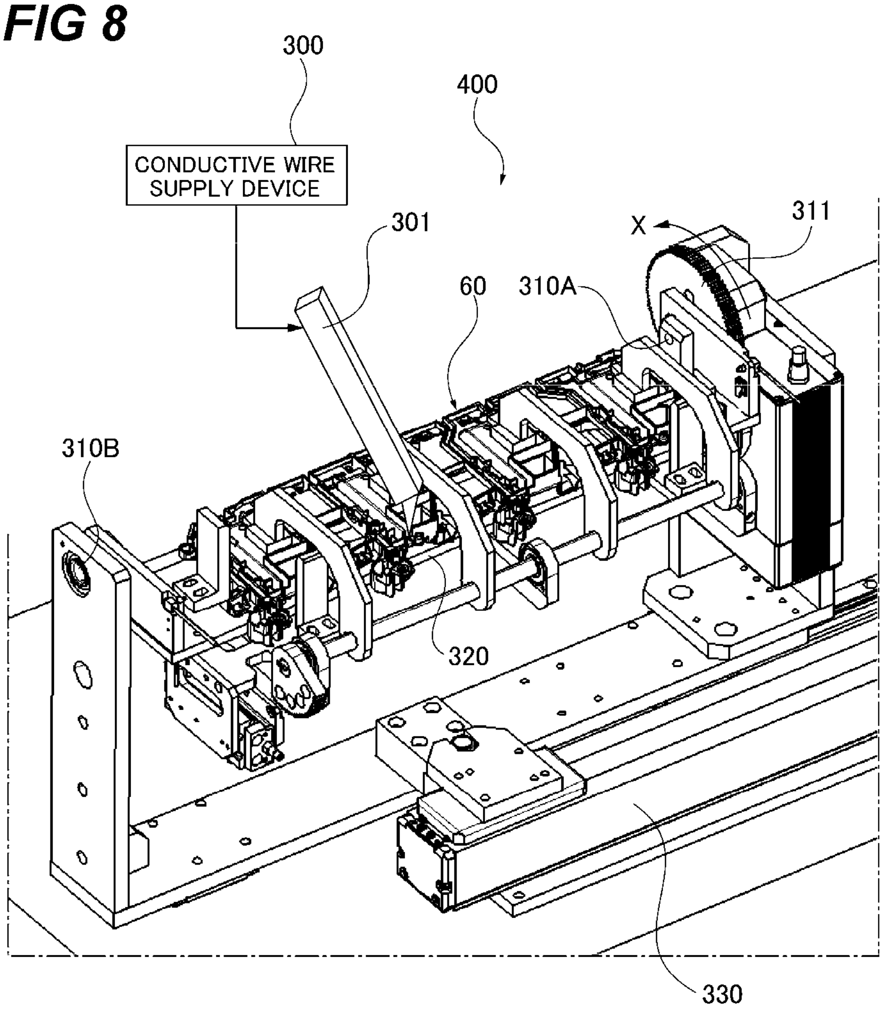
FIG. 8 is a perspective view of the automatic assembly tool.

FIG. 8 illustrates the automatic assembly tool 400 in a state where the power feed path unit 60 has been rotated 180°. As illustrated in FIG. 8, through rotation, the power feed path unit 60 is mounted with the front side surface 62 illustrated in FIG. 5 as the upper surface. The arm 301 in FIG. 8 is in the position where the placement of the conductive wire 200 is completed, and a partially enlarged view of the power feed path unit 60 in this state is illustrated in FIG. 9.

In FIG. 9, the conductive wire 200, having passed through the slit 64*a*, goes through the middle of the groove portion 64, passes through the second cylindrical portion 66, and is placed as far as 202, which is the end of the conductive wire 200.

The second cylindrical portion 66 is a second attachment portion configured to attach the charging contact 81 and the development contact 82 (see FIG. 5), which are second contacts. The second cylindrical portion 66 is provided to the front side surface 62, which is the second surface forming a predetermined angle relative to the back side surface 61, which is the first surface. The charging contact 81 and the development contact 82 are cylindrically shaped compression springs, and the second cylindrical portion 66 has, like the first cylindrical portion 65, two slits that serve as paths for the conductive wire 200.

After the conductive wire 200 is placed through the two slits in the second cylindrical portion 66, the charging contact 81 (or the development contact 82), which is a cylindrically shaped compression spring, is dropped in, along the inner circumference of the second cylindrical portion 66. Then, by mounting the imaging units U in the device main body 100A, a force is applied to the charging contact 81 (or development contact 82) by the imaging units U. A power feed path is thus formed from the high-voltage substrate 71 to the substrate contact 83, then to the conductive wire 200, to the charging contact 81 (or the development contact 82), and then to the imaging units U. The contact between the contacts is guaranteed by the reaction force of the spring, so even if the unit is out of position, the contacts will not float so as to interrupt the power feed path.

Projections 64*b* and 64*c* are formed midway along the groove portion 64 where the conductive wire 200 is routed, and the configuration is such that, by arranging the conductive wire 200 to pass below the projections 64*b* and 64*c*, the conductive wire does not drift away from the unit.

After the conductive wire 200 has been placed as far as the position of the end 202, the movement of the arm 301 and the outfeeding by the conductive wire supply device 300 stops. Thereafter, the conductive wire 200 is cut in the position of the end 202 by a cutting portion (not illustrated), which is provided close to the nozzle, thereby achieving the state illustrated in FIG. 9.

Thus, the automatic assembly tool 400 is used to perform assembly in which the conductive wire 200 is placed in the power feed path unit 60 so as to configure an electrical connecting path. In other words, the assembly flow in which the conductive wire 200 is arranged in the power feed path unit 60 to configure an electrical connecting path is undertaken through the following processes.

First, as a first process, the arm 301 of the automatic assembly tool 400 is used to wind and fix the conductive wire 200 around the wire fixing portion 63 of the power feed path unit 60, which is fixed to the unit fixing rack 320 of the automatic assembly tool 400.

Next, as a second process, the conductive wire 200, which the arm 301 has fixed to the wire fixing portion 63, is routed to the back side surface 61 among the plurality of surfaces of the power feed path unit 60.

Next, as a third process, the unit fixing rack 320 is rotated by the predetermined angle in order to cause the front side surface 62, which forms a predetermined angle relative to the back side surface 61 among the plurality of surfaces of the power feed path unit 60, to face the arm 301.

Next, as a fourth process, the conductive wire 200, which the arm 301 has fixed to the wire fixing portion 63, is continuously routed from the back side surface 61 to the front side surface 62.

The assembly, in which the conductive wire 200 is placed in the power feed path unit 60 so as to configure the electrical connecting path, is performed through these processes.

Because eight (eight paths) of the conductive wire 200 need to be arranged in the power feed path unit 60, the foregoing conductive wire assembly processes are repeated eight times. When switching the assembly path of the conductive wire from contact point to contact point, the arm 301 may be moved. However, using a tool to move the unit fixing rack 320 results in a simpler configuration. Therefore, in the automatic assembly tool 400, path switching is performed by moving the unit fixing rack 320 in the longitudinal direction (in the axial direction of the fixing rack rotating shafts 310A, 310B) by means of a moving portion 330, which is illustrated in FIG. 4.

By using the automatic assembly tool 400 to place the conductive wire 200, it is possible to construct the unit faster and more accurately than by assembling the conductive wire by hand.

As described above, it is clear that, according to this exemplary embodiment, even when the conductive wire 200 is placed across the plurality of surfaces 61, 62 of the power feed path unit 60, assembly can be performed using the tool without enlarging the automatic assembly tool 400.

In other words, according to this exemplary embodiment, the automatic assembly tool 400 can be used to place the conductive wire 200 which has passed through the plurality of surfaces 61, 62 of the power feed path unit 60. It is also possible to shorten the time required for assembly and to reduce assembly errors. Thus, it is possible to reduce the cost of the power feed path unit 60 and to increase the productivity thereof.

Note that, in the foregoing exemplary embodiment, the fixing of the conductive wire 200 to the power feed path unit 60 is carried out by winding same around the shaft portion 63*a*. However, the present invention is not limited thereto. The first locking portion provided to the power feed path unit 60 is not limited to a shaft shape, rather, same may also be a flat plate-shaped projection.

In the foregoing exemplary embodiment, the path of the conductive wire 200 in the power feed path unit 60 is rotated 180° by the automatic assembly tool 400 because both sides are used, but the present invention is not limited to such rotation. The amount of rotation by the automatic assembly tool does not have to be a constant value; for example, when two orthogonal surfaces are used as the path of the conductive wire, the tool should be rotated 90° accordingly. In other words, the path should be rotated according to the predetermined angle formed by the plurality of surfaces.

The foregoing exemplary embodiment illustrates a configuration in which four imaging units, which have a photoreceptor and a process portion acting thereon, are mounted as image forming portions of the image forming apparatus, but the number of units used is not limited and can be set as needed.

Although a laser scanner was used as the exposure portion in the foregoing exemplary embodiment, the present invention is not limited thereto, rather, an LED array, for example, may also be used.

In the foregoing exemplary embodiment, a process cartridge, which has, as process portions acting on the photoreceptor, a photoreceptor, as well as a charging portion, a developing portion, and a cleaning portion, is illustrated as an imaging unit (a cartridge) that is freely detachable from the main body of the image forming apparatus. However, the present invention is not limited thereto. In addition to the photoreceptor, the cartridge may have any one of the following as an integral part: a charging portion, a developing portion, and a cleaning portion.

Furthermore, the foregoing exemplary embodiment illustrates a configuration in which the unit including the photoreceptor is freely detachable from the main body of the image forming apparatus; however, the present invention is not limited to such a configuration. For example, the photoreceptor and each process portion acting on the photoreceptor may also be configured to be detachably attachable.

Although a printer is illustrated as the image forming apparatus in the foregoing exemplary embodiment, the present invention is not limited thereto. For example, the present invention may also be another image forming apparatus such as a copying machine or a facsimile machine, or could be another image forming apparatus such as a multi-function machine that combines these functions. The present invention is not limited to an image forming apparatus that uses an intermediate transfer member, that transfers toner images in each color to the intermediate transfer member in a sequentially superimposed manner, and that collectively transfers the toner images carried on the intermediate transfer member to a sheet. The present invention may also be an image forming apparatus that uses a sheet bearing member and that transfers toner images in each color to the sheet carried on the sheet bearing member in a sequentially superimposed manner. The same advantageous effects can be obtained by applying the present invention to the power feed path unit used by such image forming apparatuses.

In the foregoing exemplary embodiment, an electrophotographic system was used as the recording system, however, the present invention is not limited to an electrophotographic system, rather, other recording systems such as an inkjet system, for example, may also be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-156946, filed Sep. 18, 2020, which is hereby incorporated by reference herein in its entirety.

What is claimed is:

1. A guide unit for guiding a conductive wire, the guide unit comprising:

a first surface;

a wire fixing portion provided on the first surface and configured to fix a part of the conductive wire; and a first attachment portion provided on the first surface and configured to attach a first electrical contact, wherein:

the first attachment portion includes a protrusion from the first surface, the protrusion has a slit to provide a path for the conductive wire fixed to the wire fixing portion, and wherein the first electrical contact is dropped in along the protrusion and contacts with the conductive wire provided through the slit.

2. The guide unit according to claim 1, wherein the electrical contact includes a cylindrically shaped spring.

3. The guide unit according to claim 1, further comprising:

a second surface; and a second attachment portion provided on the second surface and configured to attach a second electrical contact, wherein:

the second attachment portion includes a protrusion from the second surface, and the protrusion has a slit to provide a path for the conductive wire fixed to the wire fixing portion.

4. The guide unit according to claim 1, further comprising:

a groove portion in which the conductive wire is provided.

5. The guide unit according to claim 4, further comprising:

a second surface;

wherein the groove portion is formed continuously so as to pass through the first surface and the second surfaces.

6. The guide unit according to claim 1, wherein:

the wire fixing portion includes a first locking portion and a second locking portion, a first part of the conductive wire is wound up around the first locking portion, and a second part of the conductive wire passes through the second locking portion.

7. A image forming apparatus comprising:

the guide unit according to claim 1;

an image forming process portion; and a power source unit, wherein the power source unit and the image forming process portion are electrically connected via the first electrical contact and the conductive wire.

8. A image forming apparatus comprising:

the guide unit according to claim 3;

an image forming process portion; and a power source unit, wherein the power source unit and the image forming process portion are electrically connected via the first electrical contact, the conductive wire and the second electrical contact.

* * * * *